(12) United States Patent
Cross et al.

(10) Patent No.: US 7,042,683 B1
(45) Date of Patent: May 9, 2006

(54) SLIDER-LEVEL READER ISOLATION MEASUREMENT TECHNIQUE FOR ADVANCED GMR HEADS

(75) Inventors: Ralph W. Cross, Lyons, CO (US); Chris Broussalian, Loveland, CO (US)

(73) Assignee: Maxtor Corporation, Longmont, CO (US)

(*) Notice: Subject to any disclaimer, the term of this patent is extended or adjusted under 35 U.S.C. 154(b) by 246 days.

(21) Appl. No.: 10/226,438

(22) Filed: Aug. 23, 2002

Related U.S. Application Data

(60) Provisional application No. 60/370,329, filed on Apr. 5, 2002.

(51) Int. Cl.
*G11B 5/127* (2006.01)

(52) U.S. Cl. .................................................. 360/319

(58) Field of Classification Search ............... 360/319, 360/323; 29/603.07, 603.19; 438/3, 128–130, 438/132
See application file for complete search history.

(56) References Cited

U.S. PATENT DOCUMENTS

| | | | |
|---|---|---|---|
| 5,126,901 A * | 6/1992 | Momoi et al. .......... 360/234.5 |
| 5,559,051 A * | 9/1996 | Voldman et al. ............... 438/3 |
| 5,805,390 A * | 9/1998 | Takeura ..................... 360/323 |
| 5,850,324 A | 12/1998 | Wu et al. ................... 360/113 |
| 6,054,330 A * | 4/2000 | Phipps et al. .................. 438/3 |
| 6,275,361 B1 | 8/2001 | Wallash et al. ............. 360/323 |
| 6,415,500 B1 | 7/2002 | Han et al. ................ 29/603.14 |
| 6,470,566 B1 * | 10/2002 | Hsiao et al. ............ 29/603.13 |
| 6,795,278 B1 * | 9/2004 | Jarrett et al. ................ 360/323 |

* cited by examiner

*Primary Examiner*—Angel Castro
(74) *Attorney, Agent, or Firm*—Robert G. Crouch; Marsh, Fischmann & Breyfogle LLP

(57) ABSTRACT

A read/write head for a disk drive having a shorting conductor from a shield of the read element to a conductor that runs from the write element to an external electrical contact pad. This allows for the measurement of the electrical isolation between the read sensor and the read shield via the external contact pads. Such a capability allows the electrical isolation to be measured both during the lapping process and subsequent to the heads being diced into separate sliders. This shorting conductor may be in the form of an internal shorting stud or in the form of an interim conductor that passes through the parting zone between adjacent heads. In the latter case, the shorting conductor is broken when the heads are diced so that a head of this embodiment can only be measured for electrical isolation prior to dicing.

46 Claims, 8 Drawing Sheets

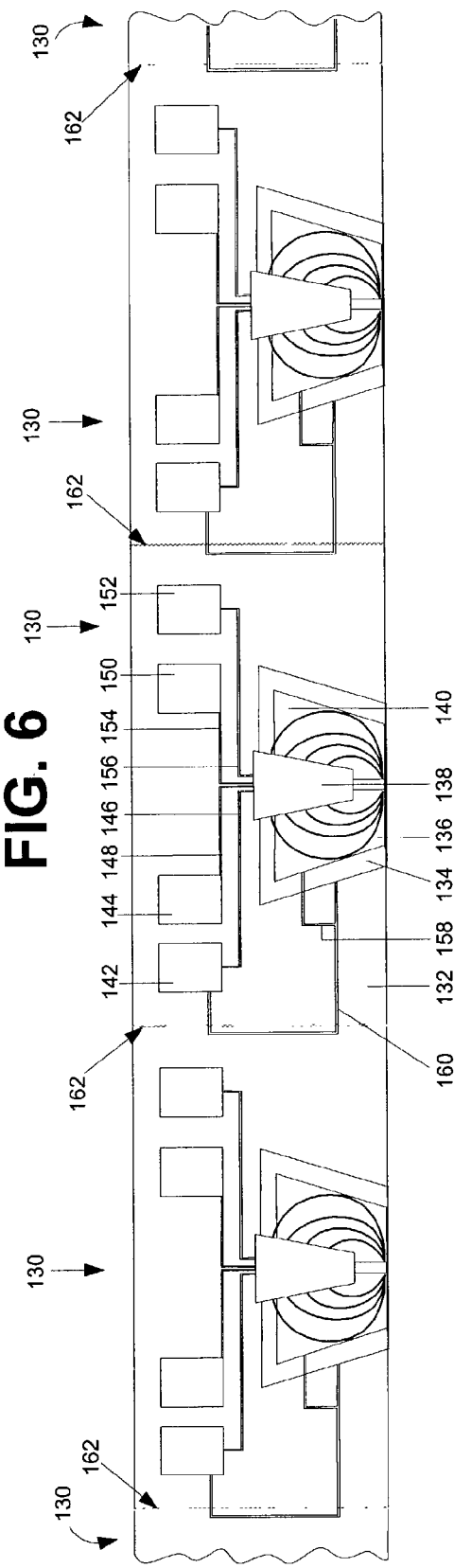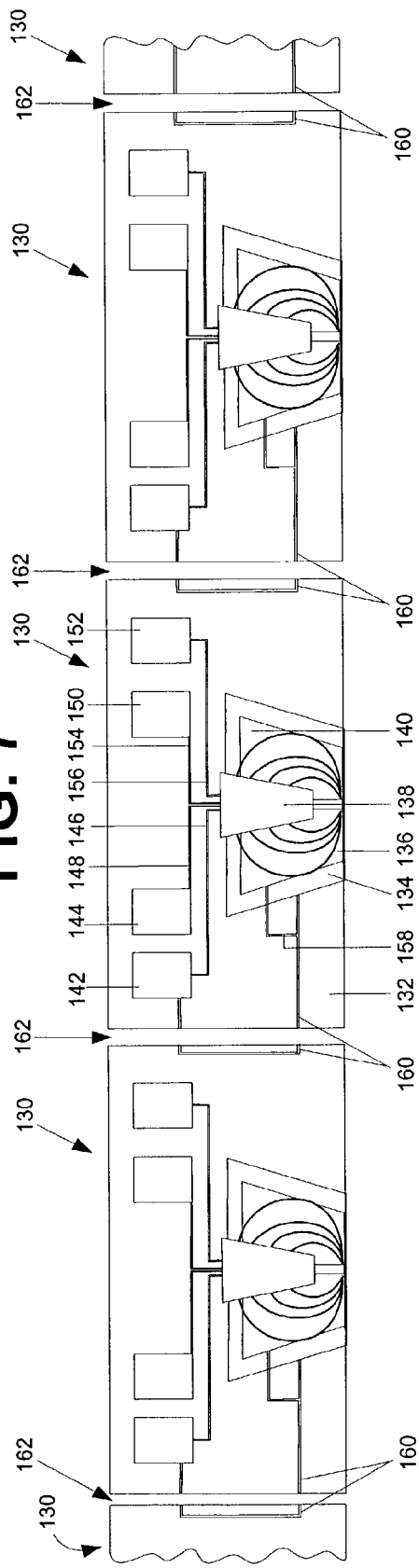

SLIDER-LEVEL READER ISOLATION MEASUREMENT TECHNIQUE FOR ADVANCED GMR HEADS

CROSS-REFERENCE TO RELATED APPLICATIONS

This application claims priority from U.S. Provisional Patent Application No. 60/370,329, filed Apr. 5, 2002, entitled "Slider-Level Reader Isolation Measurement Technique for Advanced GMR Heads", the contents of which are incorporated herein by reference.

FIELD OF THE INVENTION

This application relates to systems and methods for testing magnetoresistive (MR) heads for electrical isolation both during and subsequent to manufacture.

BACKGROUND OF THE INVENTION

In hard disk drives, data is written to and read from magnetic recording media, herein called disks, utilizing magnetoresistive transducers commonly referred to as MR heads. Typically, one or more disks having a thin film of magnetic material coated thereon are rotatably mounted on a spindle. An MR head mounted on an actuator arm is positioned in close proximity to the disk surface to write data to and read data from the disk surface.

During operation of the disk drive, the actuator arm moves the MR head to the desired radial position on the surface of the rotating disk where the MR head electromagnetically writes data to the disk and senses magnetic field signal changes to read data from the disk. Usually, the MR head is integrally mounted in a carrier or support referred to as a slider. The slider generally serves to mechanically support the MR head and any electrical connections between the MR head and the disk drive. The slider is aerodynamically shaped, which allows it to fly over and maintain a uniform distance from the surface of the rotating disk.

Typically, an MR head includes an MR read element to read recorded data from the disk and an inductive write element to write the data to the disk. The read element includes a thin layer of MR or GMR sensor stripe sandwiched between two magnetic shields that are electrically connected together but are otherwise isolated. A constant current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

The space between the shields and the magnetoresistive sensor strip are called the read gaps. Because the shields are electrically conductive, it is desirable to prevent the sensing current from leaking into the shields. For this reason, a thin dielectric film may be used to fill the read gaps so as to insulate the sensor stripe from each shield. Each of the read gaps in current devices may be in the range of 200 Angstroms (20 nanometers), while next generation devices may have read gaps in the range of 100 Angstroms.

The read/write heads are initially produced in the form of a wafer containing approximately 10,000 or more heads. A finished wafer is then cut into rows and subsequently diced into individual read/write heads in a configuration known as a slider. The surface of a read/write head that faces the disk surface is known as the air-bearing surface (ABS). The ABS portion of each head is created when the wafer is cut into rows. This row of heads, with the ABS of each head exposed, is then polished to achieve a precise stripe height for the MR element. This polishing step, also known as lapping, removes a great deal of the material of the MR head to create the slider. For example, 3,000 nanometers of original material may be lapped back to create a stripe height of 120 nanometers.

While it is known to measure the electrical isolation between the MR head and the surrounding shields during the manufacture of the wafer, prior to the present invention it is not believed to have been possible to directly measure the electrical isolation of the MR head from the shields during the lapping process or subsequent thereto, such as once a slider has been produced. Unfortunately, due to the large amount of material removed from the row of heads during the lapping process, a great deal of excess material is present and a certain portion of the sliders may be produced with very tiny pieces of material bridging the gaps between the MR head and the shields. These pieces of material are generically described as smears. The smears may take the form of micro shorts, two-sided shorts, single-sided shorts, or other types of shorts. Micro shorts are so small as to be incapable of carrying much current and are known to contribute two-state noise to the output of the MR read head.

Two-sided shorts are a pair of shorts that exist on opposite sides of the read element, so that the sensing current is effectively shunted, at least in part, around the magnetoresistive sensor of the read element and through the shield, thus reducing the output level of the read head. While it is theoretically possible to detect two-sided shorts by measuring the resistance of the MR head, it is not practical to do so because there is typically a large tolerance in the allowable resistance of the MR heads, such as between the range of 30–80 ohms. A range this broad is used because of the array processing of the MR heads as described above, wherein an entire row of heads are lapped simultaneously. Because of this broad range, parallel shunt paths of low resistance from two-sided shorts are difficult to detect.

Single-sided shorts exist on only a single side of the MR sensor and are particularly difficult to detect. They can provide a path to ground for charges that may build up on the shields. Unfortunately, this path to ground sometimes passes through the GMR element and the preamplifier stage of the disk drive electronics, and may damage the sensor or its associated circuitry. This is especially true for single-ended preamps that ground one side of the sensor.

It has been discovered (through manufacturing audits and failure analysis using scanning electron microscopy (SEM)) that some percentage of sliders may have at least one type of these smear defects and that they will at least partially degrade performance in the assembled disk drive. This degraded performance can appear as head degradation such as an increased bit error rate in the performance of the disk drive, a lower signal output, or an increased likelihood of damage from an electrostatic discharge event. Because each new generation of disk drives typically has smaller dimensions, particularly the gaps between the MR element and the shields, this problem will only continue to increase in subsequent generations of disk drives. Furthermore, even if it were desired to add further testing capability to a slider, there is a severe shortage of space on the exterior of the slider to add additional electrical contact pads in addition to the existing pair of pads for the read element and the existing pair of pads for the write element.

While at one time in the manufacture of MR heads for disk drives, the wafer level defects were the dominant source of manufacturing defects, as processes have been improved the reduction of defects resulting from the above-described smears have taken on increased importance. It is against this background and a desire to improve on the prior art that the present invention has been developed.

SUMMARY OF THE INVENTION

In view of the foregoing, a broad objective of the present invention is to reduce problems associated with electrostatic discharge (ESD) in magnetoresistive heads of disk drives. This may be referred to as increasing ESD robustness. Another objective of the present invention is to reduce head degradation manifested as noisy output signals, reduced signal levels, complete head failures, and so forth. Another objective is to provide the capability to test for electrical isolation of a magnetoresistive sensor from its shield(s) both during and after lapping processing.

In carrying out these and other objectives, features, and advantages of the present invention, a read/write head for a disk drive is provided that includes a write element and a pair of electrical conductors provided from an exterior of the head device to the write element. The head also includes a read element, a pair of electrical conductors provided from an exterior of the head device to the read element, and a shield at least partially surrounding the read element, with the shield being electrically shorted to one of the pair of conductors provided to the write element.

The short from the shield to one of the pair of conductors may extend in part outside of the read/write head. The read/write head may be initially produced from an array of read/write heads and the short may extend partially into an adjacent read/write head in the array, such that the short does not exist once the read/write heads are separated from each other. The array may be a row of read/write heads.

The short from the shield to one of the pair of conductors may be entirely inside of the read/write head. The shield may include a top shield and a bottom shield that are shorted together. The write element may be an inductive write element. The write element may include a plurality of write coils. The read element may include a magnetoresistive sensor. The magnetoresistive sensor may utilize giant magnetoresistive technology.

Another aspect of the present invention relates to a read/write head for a disk drive that includes a write element and a read element with a read sensor and a shield at least partially surrounding the read sensor. The shield of the read element is electrically shorted to the write element.

Another aspect of the present invention relates to a method of manufacturing a read/write head for a disk drive. The method includes producing a wafer containing multiple read/write heads, each read/write head having a pair of conductors provided from a read element to a pair of external contact pads and a conductor provided from a shield partially surrounding the read element to an other external contact pad. The method also includes separating the wafer into a plurality of rows of read/write heads. The method also includes lapping each row of read/write heads back to a desired size while monitoring, for one of the read/write heads of the row, the electrical isolation between the shield and the read element via the other external contact pad and one of the pair of external contact pads.

The lapping operation may further include monitoring, for one of the read/write heads of the row, the electrical resistance of the read element to determine when the resistance is greater than a predetermined amount. The electrical resistance may be monitored until it is within an acceptable range. The resistance monitoring may provide information relating to the size of the read/write head. The lapping operation may include lapping, then testing the resistance and the isolation, and if either the resistance or the isolation are outside of predetermined limits, repeating each of these sub-operations. The lapping may be continued until the electrical isolation is substantially equal to or greater than a predetermined threshold.

Another aspect of the present invention relates to a method of manufacturing a read/write head for a disk drive. The method includes producing a wafer containing multiple read/write heads, each read/write head having a pair of conductors provided from a read element to a first pair of external contact pads, a pair of conductors provided from a write element to a second pair of external contact pads, and a conductor provided from a shield partially surrounding the read element to one of the pair of conductors provided from the write element to the one of the second pair of external contact pads. The method also includes separating the wafer into a plurality of rows of read/write heads and lapping each row of read/write heads back to a desired size while monitoring, for one of the read/write heads of the row, the electrical isolation between the shield and the read element via measuring the isolation between the one of the second pair of external contact pads and one of the first pair of external contact pads.

Another aspect of the present invention relates to a method of manufacturing a read/write head for a disk drive. The method includes producing a wafer containing multiple read/write heads, each read/write head having a read element with a sensor, a conductor provided from the sensor to a first external contact pad, a shield, and a conductor provided from the shield to a second external contact pad. The method also includes separating the wafer into a plurality of rows of read/write heads and lapping each row of read/write heads back to a desired size while monitoring, for one of the read/write heads of the row, the electrical isolation between the sensor and the shield via the first external contact pad and the second external contact pad.

Another aspect of the present invention relates to a method of testing a read/write head for a disk drive, when the head is not attached to any other read/write head. The method includes measuring the electrical isolation between a read sensor of a read element and a read shield of a read element, comparing the measured electrical isolation of the read element to a predetermined threshold, and determining whether to reject the read/write head based on the comparison.

The predetermined threshold may be at least 10 MΩ at 5 volts or at least 100 MΩ at 10 volts.

Another aspect of the present invention relates to a read/write head for a disk drive that includes a write element and a read element including a sensor and a shield, the sensor being connected to a pair of external electrical contact pads on the read/write head and the shield being connected to a third external electrical contact pad on the read/write head. The electrical isolation between the sensor and the shield can be measured when the read/write head is no longer connected to any other read/write heads by measuring the electrical isolation between the third contact pad and one of the pair of contact pads.

The connection of the shield to the third contact pad may exist entirely within the confines of the read/write head. The connection of the shield to the third contact pad may extend in part outside of the read/write head. The read/write head may be initially produced from an array of read/write heads and the connection of the shield to the third contact pad may extend partially into an adjacent read/write head in the array, such that said connection does not exist once the read/write heads are separated from each other. The array may be a row of read/write heads.

Another aspect of the present invention relates to a read/write head for a disk drive including a substrate, a bottom shield layer located above the substrate, and a read sensor layer located above the bottom shield layer, the read sensor layer including a read sensor and conductive elements. The head also includes a top shield located above the read sensor layer, a via that shorts the top shield to the bottom shield, and a first pole layer located above the top shield layer. The head also includes a plurality of inductive write coils located above the first pole layer, a second pole layer located, at least in part, above the write coils, and a pair of write external electrical contact pads. The head also includes a pair of conductive traces connecting opposite ends of the write coils to respective ones of the write contact pads, a pair of read external electrical contact pads, and a pair of conductive traces connecting the conductive elements at opposite ends of the read sensor layer to the read contact pads. The head further includes a shorting stud conductively connecting one of the top shield and the bottom shield to one of the conductive traces connected to the write contact pads.

Numerous additional features and advantages of the present invention will become apparent to those skilled in the art upon consideration of the further description that follows.

BRIEF DESCRIPTION OF THE DRAWINGS

FIG. 6 is a top view of a head of the present invention showing an alternative embodiment in which a short between the shields of the read element and one of the electrical contact pads of the write coils passing through an adjacent head in a row of heads prior to separation of the heads into single units.

FIG. 7 is a top view of a head of the present invention showing an alternative embodiment in which a short between the shields of the read element and the electrical contact pad of the write coils is broken due to separation of the heads from each other.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention may be applicable to other applications where testing of electrical isolation between a read head (e.g., such as an MR or GMR head) and its surrounding shields is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Figure 1:
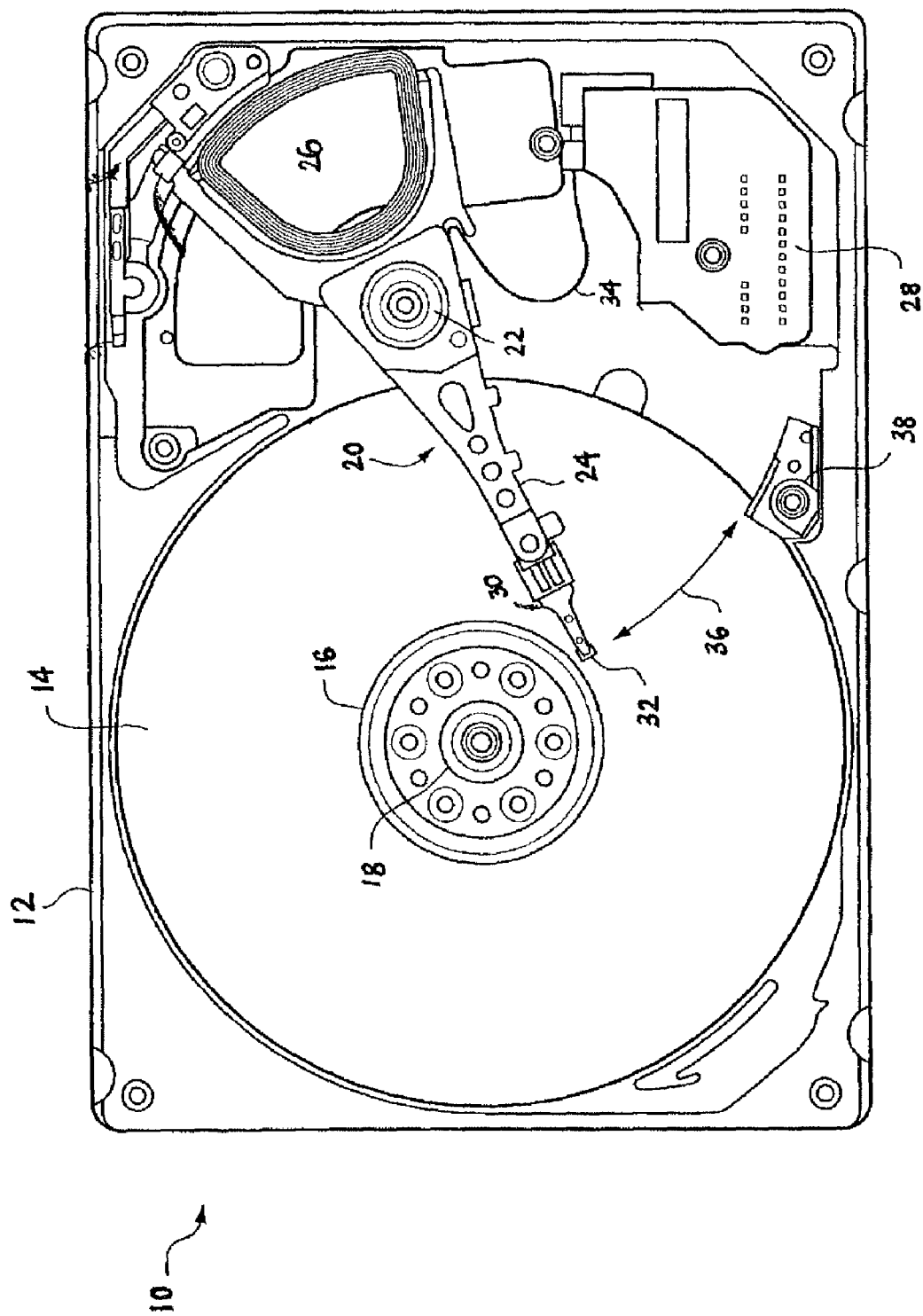
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read/write technologies such as anisotropic magnetoresistive (AMR), giant magnetoresistive (GMR), and tunneling magnetoresistive (TuMR), other magnetoresistive technologies, or other suitable technologies. AMR is due to the anisotropic magnetoresistive effect with a normalized change in resistance ($\Delta R/R$) of 2–4%. GMR results from spin-dependent scattering mechanisms between two magnetic layers (or more). The typical use in recording heads is the spin valve device that uses a free layer to detect external fields, and a pinned magnetic layer. The normalized change in resistance is typically 8–12%, but can be as large as 15–20% when used with specular capping layers and spin-filter layers. TuMR is similar to GMR, but is due to spin dependent tunneling currents across an isolation layer. The typical embodiment consist of a free layer and a pinned layer separated by a insulating layer of $Al_2O_3$ with the current flowing perpendicular to the film plane, producing normalized change in resistance of 12–25%. The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on their corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
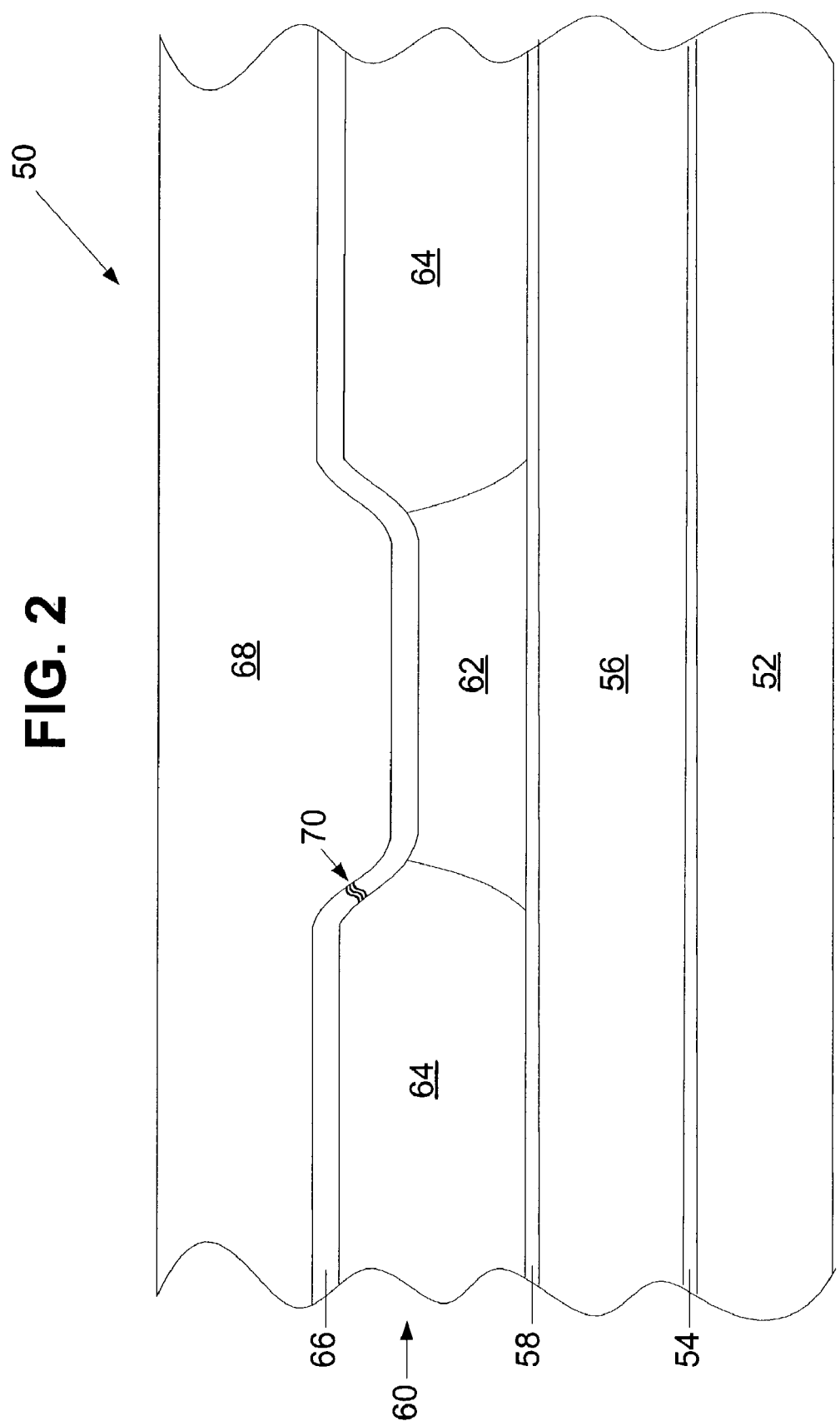
FIG. 2 is a front elevation view of a head of the present invention showing a single-sided short defect.

FIG. 2 illustrates a read element 50 of the head on the slider 32. The read element 50 is a multi-layered element including a substrate 52 onto which a suitable seed layer 54 is deposited. A bottom shield layer 56 is deposited on top of the seed layer 54. An electrically-insulating first read gap layer 58 is deposited on top of the bottom shield layer 56. On top of the first read gap layer 58, a magnetoresistive sensor layer 60 is deposited. The magnetoresistive sensor layer 60 includes a central area that includes magnetoresistive material 62 (e.g., AMR, GMR, or TuMR) that is abutted on either side by a permanent magnet and conductor element 64 to electrically connect the magnetoresistive sensor 62 to electrical contact pads on the exterior of the slider 32. Note that the height of the magnetoresistive sensor 62 is significantly less than the height of the permanent magnet/conductor 64 region of the magnetoresistive sensor layer 60. On top of this sensor layer 60, a second read gap layer 66 is deposited. A top shield layer 68 is deposited on top of the second read gap layer 66. It is the design of the read element 50 that the magnetoresistive sensor layer 60 should be electrically isolated from the top shield layer 68 and bottom shield layer 56 to an isolation level in the range of 10 M$\Omega$ at 5 volts and preferably more like 100 M$\Omega$ at 10 volts.

In this case, a single-sided short 70 is shown shorting the top shield layer 68 to the permanent magnet/conductor layer 64 on one side of the magnetoresistive sensor 62. As discussed previously, such a single-sided short can have adverse consequences on the head and its associated electronics since it provides a path for electrostatic charges built up on the top shield 68 to flow through to the electronics associated with the magnetoresistive sensor layer 60. In addition, this single-sided short cannot be detected by measuring the resistance of the magnetoresistive sensor layer 60.

Figure 3:
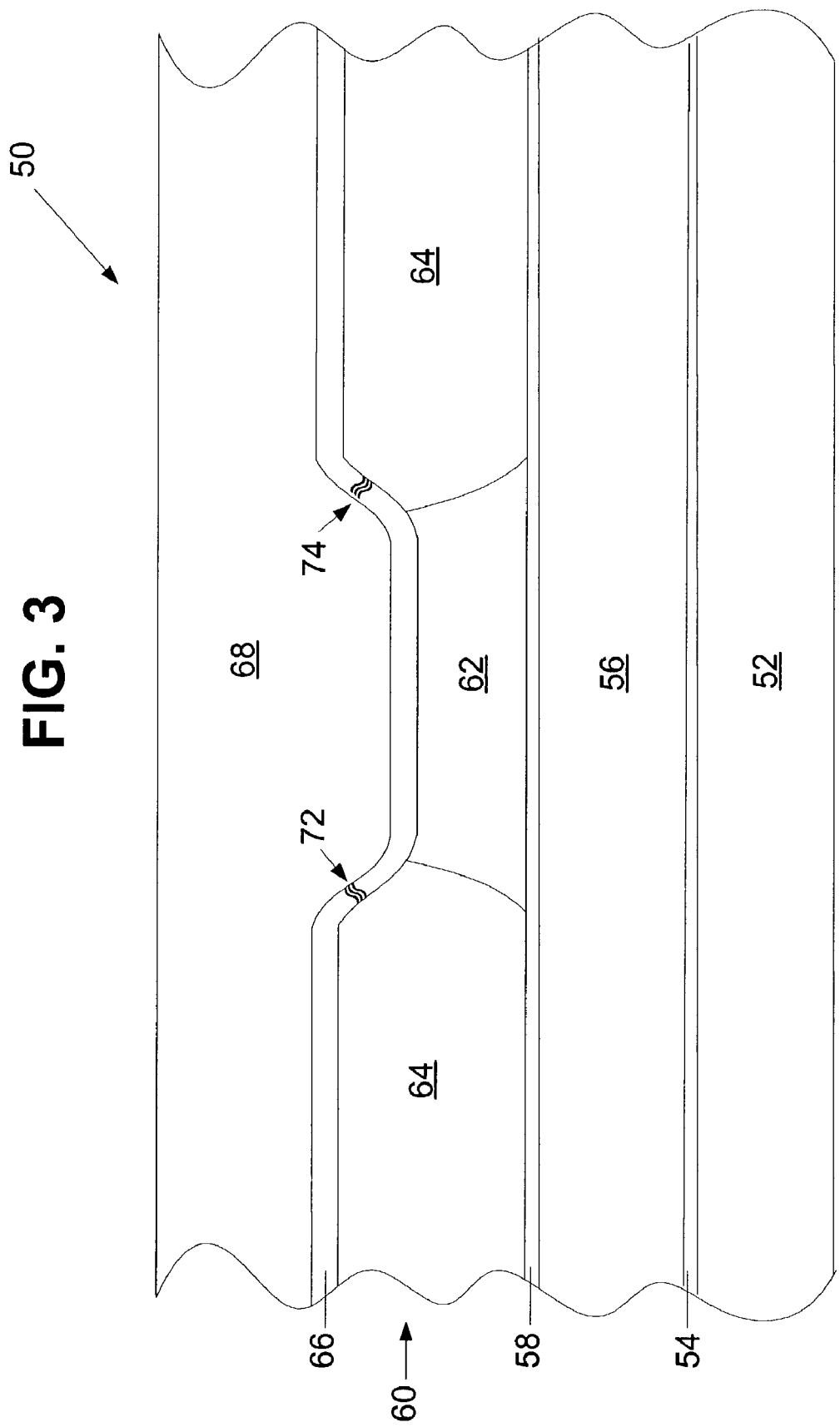
FIG. 3 is a front elevation view of a head of the present invention showing a two-sided short defect.

FIG. 3 is similar to FIG. 2 and identical reference numbers are utilized to refer to identical components therein. In this illustration, a two-sided short defect is demonstrated as exemplified by a short 72 between the top shield 68 and the permanent magnet/conductor region 64 on one side of the magnetoresistive sensor 62 and a short 74 located between the top shield layer 68 and another side of the permanent magnet/conductor region 64. This two-sided short will somewhat reduce the resistance of the magnetoresistive sensor layer 60, but may not reduce the resistance sufficiently so as to be detected because resistances within a broad range are normally found to be acceptable. Because a portion of the sensing current passed through the magnetoresistive sensor layer 60 is shunted around the magnetoresistive sensor 62 and through the top shield 68, a reduced signal output occurs. In addition, there is a path for the passage of electrostatic charges from the top shield 68 to the electronics associated with the magnetoresistive sensor layer 60 and to the MR sensor itself, which is very prone to ESD damage (due to its small size). ESD damage can be either physical (change resistance) or magnetic (unstable readback) or both. Both physical and/or magnetic changes can cause drive failure.

Figure 4:
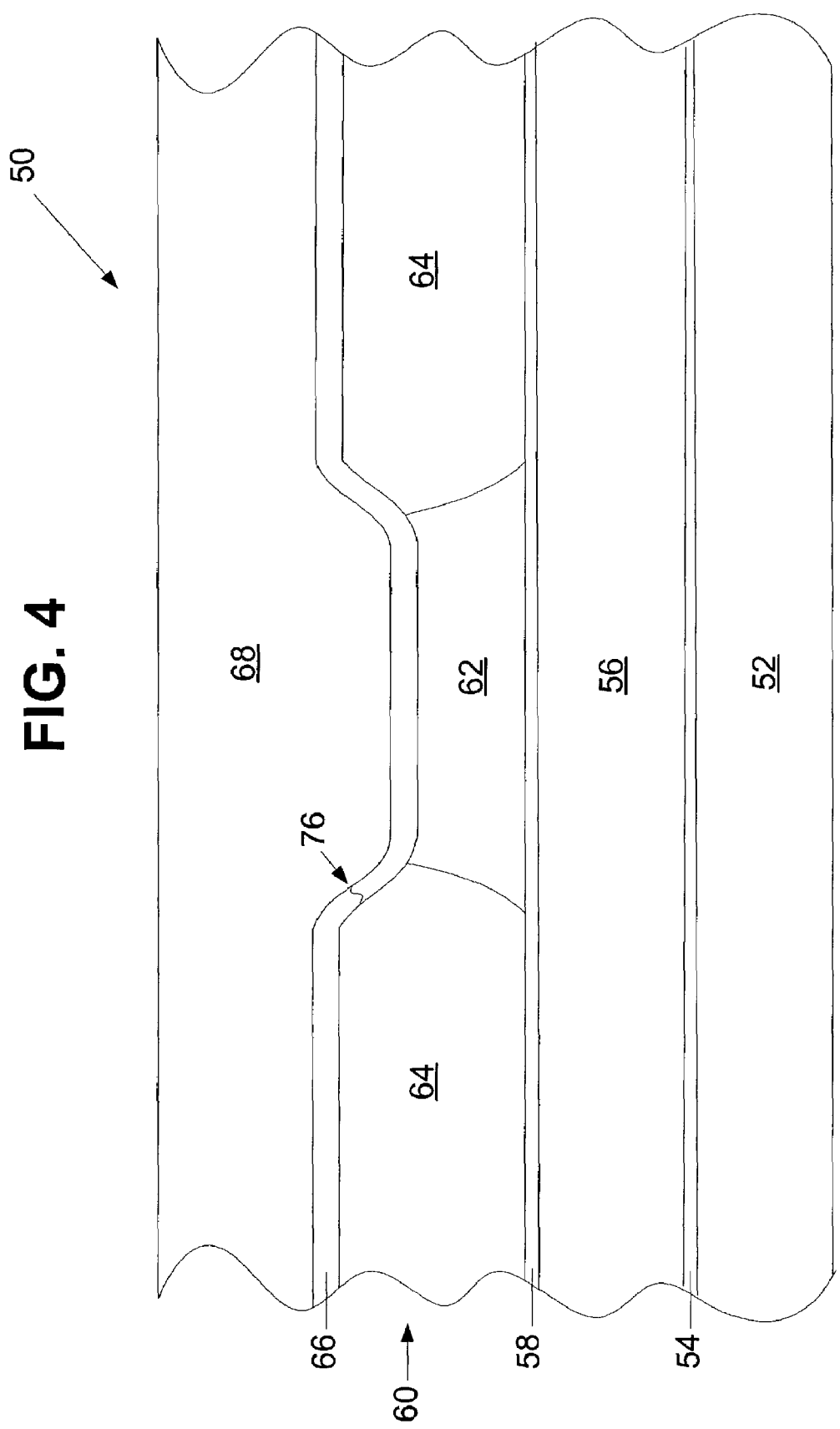
FIG. 4 is a front elevation view of a head of the present invention showing a micro short defect.

Another type of smear is illustrated in FIG. 4 in which a micro short 76 is shown shorting the top shield layer 68 to a portion of the permanent magnet/conductor region 64. While the cross-sectional area of this micro short 76 may be sufficiently small so as to reduce the amount of electrostatic charge passed to the electronics as compared to the single-sided short and two-sided short illustrated in FIGS. 2 and 3, respectively, the micro short still increases the noise in the signal output of the read element 50.

While each of these smear defects was illustrated as a short between the top shield layer 68 and the permanent magnet/conductor region 64 of the magnetoresistive sensor layer 60, other configurations of defects are also possible. For example, the defects could short between the magnetoresistive sensor layer 60 and the bottom shield layer 56. In addition, the defects could short between either the bottom shield layer 56 or top shield layer 68 and the magnetoresistive sensor 62 of the magnetoresistive sensor layer 60.

Figure 5:
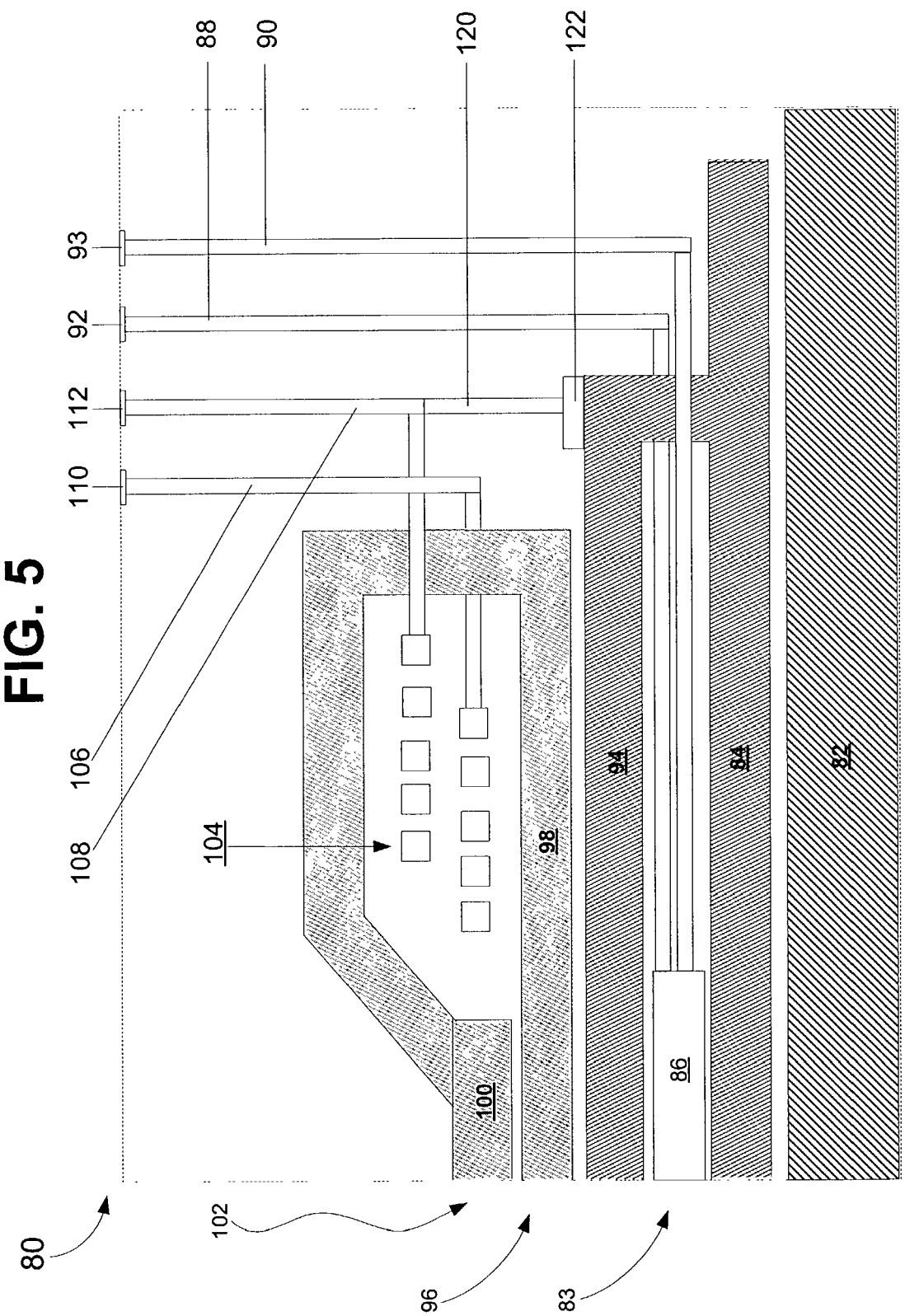
FIG. 5 is a side elevation view of a head of the present invention showing certain portions in cross-section and showing a shorting stud that shorts the top shield of the read element to one of the electrical contacts for the write coils.

In order to detect the presence of such smear defects in a head on a slider or in a row of heads that have not yet been separated, the present invention provides a means for measuring the electrical isolation. FIG. 5 shows a simplified version of a read/write head 80 of the present invention. In a similar, but simplified, manner as the read element 50 in FIGS. 2–4, the read/write head 80 includes a substrate 82 onto which a read element 83 is placed. The read element 83 includes a bottom shield 84. Next, a magnetoresistive sensor 86 is provided. The magnetoresistive sensor 86 is connected to a pair of conductors 88 and 90 that provide a conductive path between the magnetoresistive sensor 86 and a pair of read element electrical contact pads 92 and 93 provided on an exterior surface of the read/write 80. A top shield 94 is provided above the magnetoresistive sensor 86, and the top shield 94 is in electrical connection with the bottom shield 84.

Above the top shield 94 is the write element 96 of the read/write head 80. The write element 96 includes a bottom pole layer 98 and a top pole layer 100 that is connected to the bottom pole layer 98. Located between the two pole layers 98 and 100 and recessed back from an air-bearing surface 102 of the read/write head 80 are a plurality of write coils 104 that are utilized to induce magnetic patterns on the portion of the disk 14 adjacent to the write element 96. A pair of conductors 106 and 108 connect the write coils 104 electrically to the write element electrical contact pads 110 and 112, respectively.

The read/write head 80 of the present invention also features a shorting stud 120 connected at one end to the conductor 108 of the write element 96 and connected at an opposite end to an electrical bonding pad 122 located on the top shield 94 of the read element 83. As can be appreciated, with this shorting stud 120 connecting the one of the conductors 108 of the write element 96 to the shields 84 and 94 of the read element 83, it is possible to measure the electrical isolation between the magnetoresistive sensor 86 and the shields 84 and 94. In addition, there is little other impact from shorting the coils 104 of the write element 96 to the shields 84 and 94 of the read element 83. For one thing, the read and write operations in the disk drive 10 do not typically occur simultaneously. In addition, the imbalance in impedances (primarily capacitive) between the two conductors 106 and 108 and the write coils 14 does not appear to be significant.

With the embodiment of the read/write head 80 shown in FIG. 5, it can be appreciated that it is possible to monitor not only the electrical resistance of the combination of the connectors 88 and 90 and the magnetoresistive sensor 86, but also monitor the electrical isolation between the shields 84 and 94 and the combination of the conductors 88 and 90 and the magnetoresistive sensor 86. In addition, this monitoring of the electrical isolation can occur both during the processing of the row or bar of read/write heads 80 (e.g. during lapping) as well as once the read/write heads 80 have been separated from each other, such as when they are in the form of separate sliders.

Another embodiment of a read/write head 130 is shown in FIGS. 6 and 7. In this simplified version of the read/write head 130, a substrate 132 has a bottom shield 134 and a top shield 136 that sandwich a magnetoresistive sensor therebetween. On top of the top shield 136, is a pair of pole pieces (only the top pole piece 138 is shown). Sandwiched between the pole pieces are portions of a plurality of write coils 140. The write coils are connected to a pair of write electrical contact pads 142 and 144 by electrical conductors 146 and 148, respectively. The magnetoresistive sensor is connected to a pair of read electrical contact pads 150 and 152 by electrical conductors 154 and 156, respectively. The bottom and top shields 134 and 136 are intentionally shorted together by a shield short conductor 158. In addition, the shield short conductor 158 is in electrical contact with one of the write electrical contact pads 142 via an interim conductor 160.

FIG. 6 shows a plurality of the read/write heads 130 prior to separation from each other, such as during the lapping process. In this configuration, it can be appreciated that the interim conductor 160, which passes from one read/write head 130 across a parting zone 162 partially through an adjacent read/write head and back through the parting zone 162 to the original read/write head, is intact. FIG. 7 shows the read/write heads after they have been separated from each other along the parting zones 162 and are ready for installation on an actuator arm assembly 20. In this configuration, it can be appreciated that the interim conductor 160 is broken. The interim conductor 160 no longer places the shields 134 and 136 in electrical contact with the write electrical contact pad 142 because a portion of the interim conductor 160 has been removed therefrom. Thus, it can be appreciated that the electrical isolation can be measured while the read/write heads 130 are still connected to each other such as during lapping processing, but it is not possible to perform the electrical isolation testing once the read/write heads have been separated from each other. One of the benefits of this approach is that the impedance of the separate write electrical contact pads and conductors are not different from each other during operation because the interim conductor 160 has been effectively eliminated.

Figure 8:
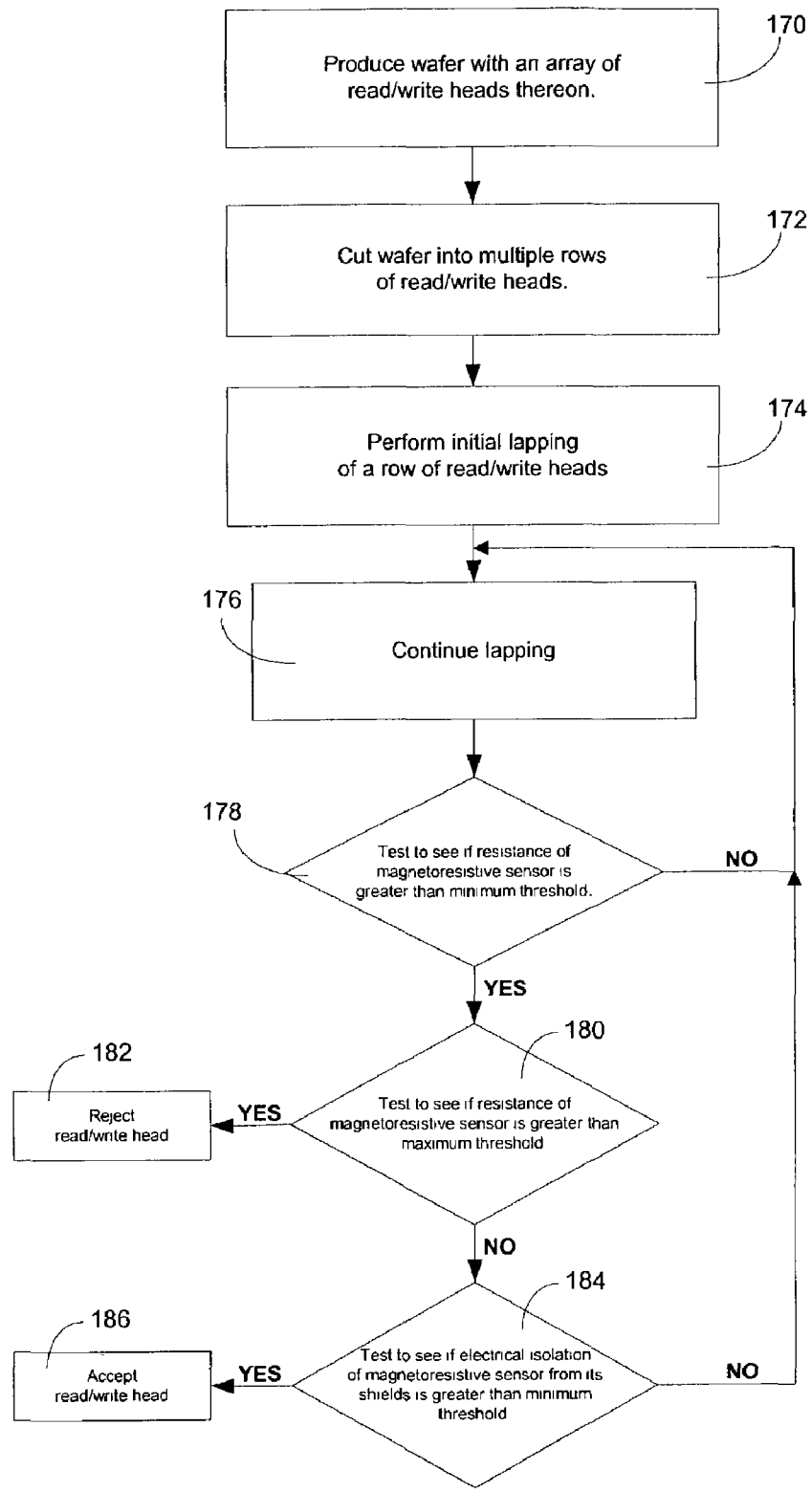
FIG. 8 is a flow chart illustrating an exemplary process according to the present invention for testing the electrical isolation of read/write heads during final lapping processing.
Figure 9:
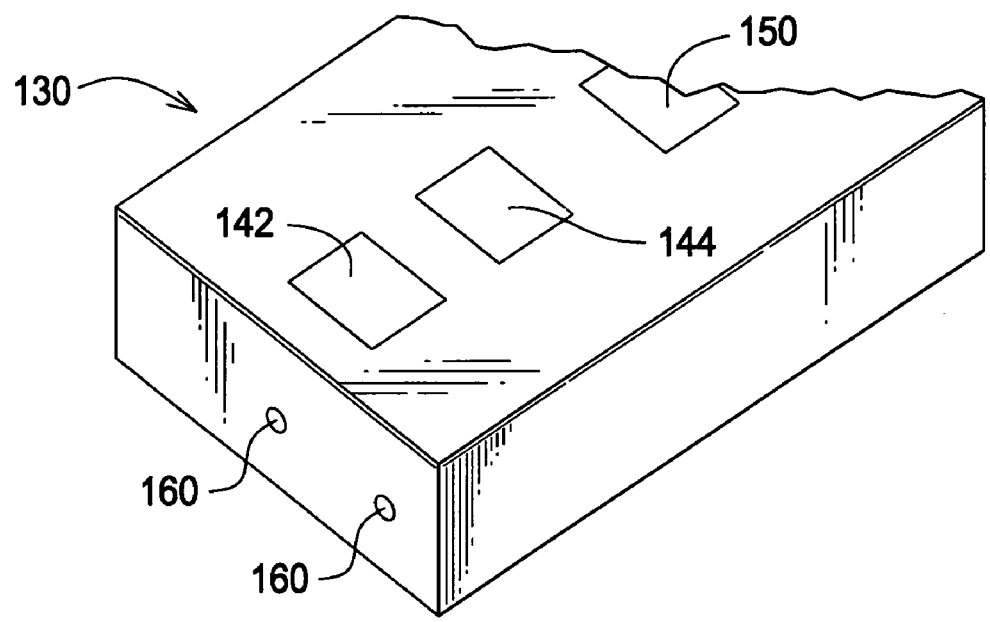
FIG. 9 is a perspective view of a head of the present invention, showing a side surface of the write head and showing exposed ends of one or more conductors within the head.
Figure 10:
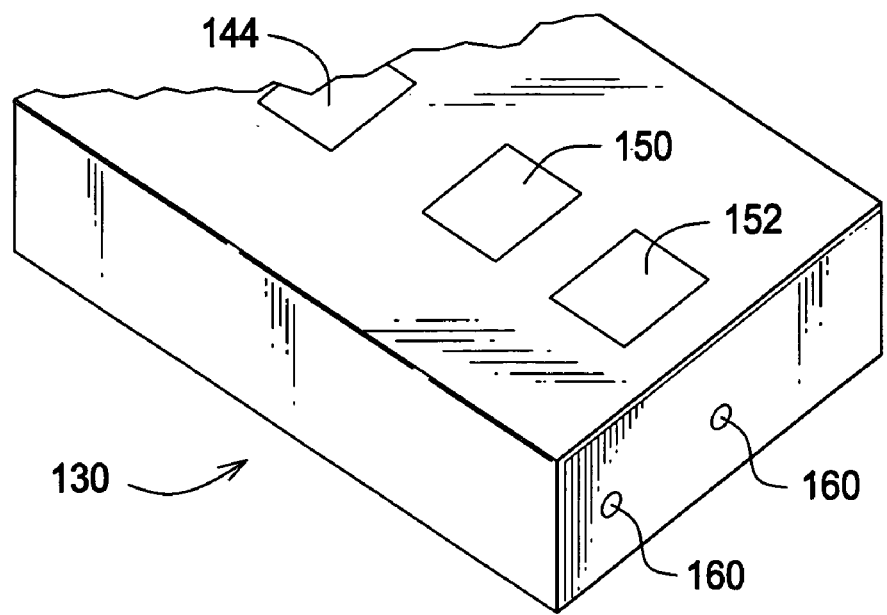
FIG. 10 is a perspective view of the head of FIG. 9, showing an opposite side surface of the write head and showing exposed ends of one or more conductors within the head.

It can be appreciated that with the present invention, 100% of read/write heads can be screened after final lapping to assure that they meet a predetermined isolation specification. One example of a test procedure is illustrated in FIG. 8. First, a wafer 170 is produced with an array of read/write heads arranged thereon. Next, the wafer is cut 172 into multiple rows of read/write heads. For each row of read/write heads, an initial lapping stage is performed 174. After this, a final lapping stage is entered in which the lapping continues 176. Either during the continuous final lapping or at specified breaks in the final lapping process, the following tests are performed. First, a test is performed 178 to see if the resistance of the magnetoresistive sensor for a given read/write head is greater than the minimum threshold. Because the resistance of the magnetoresistive sensor is inversely proportional to the stripe height, the resistance will increase as material is lapped away. Once a sufficient amount of material has been lapped away to place the resistance to be greater than a minimum threshold (e.g., 30 ohms) the test is passed. If the resistance is not yet greater than the minimum threshold, processing continues to step 176 described above in which the final lapping continues. If the resistance is greater than the minimum threshold, then control processing passes to another test 180 to see if the resistance of the magnetoresistive sensor is greater than a maximum threshold. A maximum threshold (e.g., 80 ohms) may be provided for the magnetoresistive sensor. In the case where too much material has been lapped away and the stripe height is too small, this test will be passed. Once test 180 is passed, the read/write head is rejected 182. In the case where the resistance of the magnetoresistive sensor is not yet greater than the maximum threshold, processing passes to another test 184 to see if the electrical isolation of the magnetoresistive sensor from its shields is greater than a minimum threshold (e.g. 10 MΩ at 5 volts, or preferably 100 MΩ at 10 volts). If test 184 is failed, then processing continues back to step 176 in which additional final lapping is performed. This may be done in order to knock or clear away any debris that may have caused a smear resulting in test 184 failing. The intention is that additional final lapping will eliminate the smear defect, but will not lap away so much material as to reduce the stripe height to a size small enough to result in failure of test 180. Once test 184 is passed, the read/write head is accepted 186.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A read/write head for a disk drive, comprising:
   a write element;
   a pair of electrical conductors provided from an exterior of the head to the write element;
   a read element;
   a pair of electrical conductors provided from an exterior of the head to the read element;
   a shield at least partially surrounding the read element;
   wherein the shield is electrically shorted to one and only one of the pair of conductors provided to the write element;
   wherein the read/write head is initially produced from an array of read/write heads and the short extends partially into an adjacent read/write head in the array, such that the short does not exist once the read/write heads are separated from each other.

2. A read/write head as defined in claim 1, wherein the short from the shield to one of the pair of conductors extends in part outside of the read/write head.

3. A read/write head as defined in claim 1, wherein the array is a row of read/write heads.

4. A read/write head as defined in claim 1, wherein the shield includes a top shield and a bottom shield that are shorted together.

5. A read/write head as defined in claim 1, wherein the write element is an inductive write element.

6. A read/write head as defined in claim 5, wherein the write element includes a plurality of write coils.

7. A read/write head as defined in claim 1, wherein the read element includes a magnetoresistive sensor.

8. A read/write head as defined in claim 7, wherein the magnetoresistive sensor is a giant magnetoresistive sensor.

9. A read/write head for a disk drive, comprising:
   a write element having two terminals;
   a read element including a read sensor and a shield at least partially surrounding the read sensor;
   wherein the shield of the read element is electrically shorted to one and only one terminal of the write element;
   wherein the read/write head is initially produced from an array of read/write heads and the short extends partially into an adjacent read/write head in the array, such that the short does not exist once the read/write heads are separated from each other.

10. A read/write head as defined in claim 9, wherein the short from the shield to the read element extends in part outside of the read/write head.

11. A read/write head as defined in claim 9, wherein the array is a row of read/write heads.

12. A read/write head as defined in claim 9, wherein the shield includes a top shield and a bottom shield that are shorted together.

13. A read/write head as defined in claim 9, wherein the write element is an inductive write element.

14. A read/write head as defined in claim 13, wherein the write element includes a plurality of write coils.

15. A read/write head as defined in claim 9, wherein the read element includes a magnetoresistive sensor.

16. A read/write head as defined in claim 15, wherein the magnetoresistive sensor is a giant magnetoresistive sensor.

17. A read/write head for a data storage device that stores data on a storage medium, the head comprising:
    a write element that writes data to the storage medium;
    a magnetoresistive read element that reads data from the storage medium;
    a conductor electrically isolated from the write element and the read element the conductor having two spaced-apart ends that are exposed on the exterior of the read/write head.

18. A read/write head as defined in claim 17, wherein the exposed ends are on separate external surfaces of the read/write head.

19. A read/write head as defined in claim 18, wherein the separate external surfaces are planar and orthogonal to each other.

20. A read/write head as defined in claim 19, wherein one of the external surfaces is a top surface and the other is a side surface.

21. A read/write head as defined in claim 17, wherein one of the exposed ends is an external electrical contact pad.

22. A read/write head as defined in claim 21, wherein the external electrical contact pad is electrically connected to the write element.

23. A read/write head as defined in claim 17, wherein the read element includes a shield; and
    the read/write head further includes a conductor having one end that is exposed on the exterior of the read/write head and an other end that is connected to the shield.

24. A read/write head as defined in claim 23, wherein the two ends of the conductor with exposed spaced-apart ends are located on separate planar surfaces that are orthogonal to each other, wherein the head has a third planar surface that is orthogonal to one and parallel to an other of the separate planar surfaces, and further wherein the third planar surface includes two spaced-apart ends of a single conductor.

25. A read/write head as defined in claim 17, wherein the magnetoresistive read element is a giant magnetoresistive sensor.

26. A read/write head for a data storage device, comprising:
a magnetoresistive read element having a shield, the element having a pair of terminal pads;
a write element, the element having a pair of terminal pads; and
a side surface of the read/write head that is different from a surface where the read and write terminal pads are exposed, the side surface having both an exposed end of a first conductor that is electrically connected to the write element and an exposed end of a second conductor that is electrically connected to the shield.

27. A read/write head as defined in claim 26, further including a second surface where a single conductor has two exposed ends.

28. A read/write head as defined in claim 27, wherein the single conductor with two exposed ends on the second surface is electrically isolated from the shield.

29. A read/write head as defined in claim 27, wherein the single conductor with two exposed ends on the second surface is electrically isolated from the write element.

30. A read/write head as defined in claim 27, wherein the single conductor with two exposed ends on the second surface is electrically isolated from the shield and from the write element.

31. A read/write head as defined in claim 26, further including an external electrical contact pad that is electrically connected to the write element and therefore to the exposed end on the side surface, wherein the external electrical contact pad and the exposed end connected thereto are on separate external surfaces of the read/write head.

32. A read/write head as defined in claim 26, wherein the magnetoresistive read element is a giant magnetoresistive sensor.

33. A read/write head for a data storage device, comprising:
a magnetoresistive read element having a shield;
a write element;
a side surface of the read/write head having both an exposed end of a first conductor that is electrically connected to the write element and an exposed end of a second conductor that is electrically connected to the shield; and
a second surface where a single conductor has two exposed ends, wherein the second surface is on an opposite side from the side surface.

34. A read/write head as defined in claim 33, wherein the exposed ends on the side surface are spaced apart by a distance equal to the distance between the exposed ends on the opposite side.

35. A read/write head as defined in claim 34, wherein a line drawn orthogonal to the side surface through one of the exposed ends on the side surface would pass through one of the ends on the opposite side and a line drawn orthogonal to the side surface through the other of the exposed ends on the side surface would pass through the other of the ends on the opposite side.

36. A read/write head as defined in claim 33, wherein the second surface is parallel to the side surface.

37. A read/write head for a data storage device that stores data on a storage medium, the head comprising:
a write element that writes data to the storage medium;
a magnetoresistive read element that reads data from the storage medium;
a pair of opposite side surfaces of the read/write head, one side surface having an exposed end of a first conductive trace thereon that is connected to one of the write element or the read element, the other side surface having an exposed end of a second conductive trace thereon that is no longer connected to the write element or the read element.

38. A read/write head as defined in claim 37, wherein a line drawn orthogonal to one of the pair of opposite side surfaces through the exposed end thereon would pass through the exposed end on the other of the opposite side surfaces.

39. A read/write head as defined in claim 37, wherein each of the pair of opposite side surfaces of the read/write head includes two exposed ends of conductive traces.

40. A read/write head as defined in claim 39, wherein the two exposed ends on one of the pair of opposite side surfaces are connected together by a conductor.

41. A read/write head as defined in claim 39, wherein the read element includes a shield, wherein one of the two exposed ends on one of the pair of opposite side surfaces is connected to the write element, and further wherein the other of the two exposed ends on one of the pair of opposite side surfaces is connected to the shield of the read element.

42. A read/write head as defined in claim 41, wherein the two exposed ends on the other of the pair of opposite side surfaces are connected together by a conductor.

43. A read/write head as defined in claim 37, wherein the pair of opposite side surfaces of the read/write head are parallel to each other.

44. A read/write head as defined in claim 37, wherein the magnetoresistive read element is a giant magnetoresistive sensor.

45. A read/write head for a data storage device that stores data on a storage medium, the head comprising:
a write element that writes data to the storage medium;
a magnetoresistive read element that reads data from the storage medium;
a pair of opposite sides of the read/write head, one side having an exposed end of a first conductive trace thereon that is connected to one of the write element or the read element, the other side having an exposed end of a second conductive trace thereon that is no longer connected to the write element or the read element;
wherein each of the pair of opposite sides of the read/write head includes two exposed ends of conductive traces;
wherein the read element includes a shield, wherein one of the two exposed ends on one of the pair of opposite sides is connected to the write element, and further wherein the other of the two exposed ends on one of the pair of opposite sides is connected to the shield of the read element;
wherein the two exposed ends on the other of the pair of opposite sides are connected together by a conductor;
wherein the two exposed ends on the other of the pair of opposite sides that are connected together by the conductor are electrically isolated from the shield and the write element.

46. A read/write head as defined in claim 45, wherein the pair of opposite sides of the read/write head are parallel to each other.

* * * * *